April 1, 1924.
A. O. CARPENTER
POWER UNIT
Filed Sept. 30, 1922
1,488,529
2 Sheets-Sheet 2
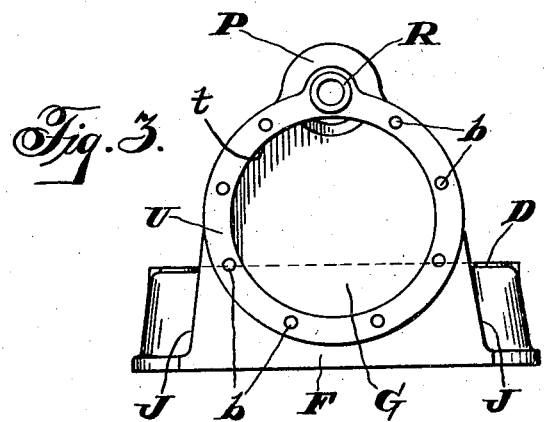
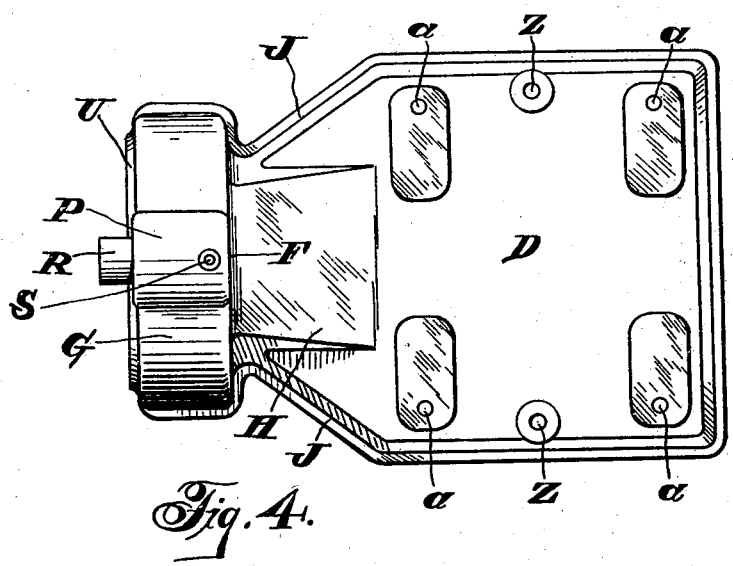
Inventor
Allan O. Carpenter.
By His Attorney Patented Apr. 1, 1924.

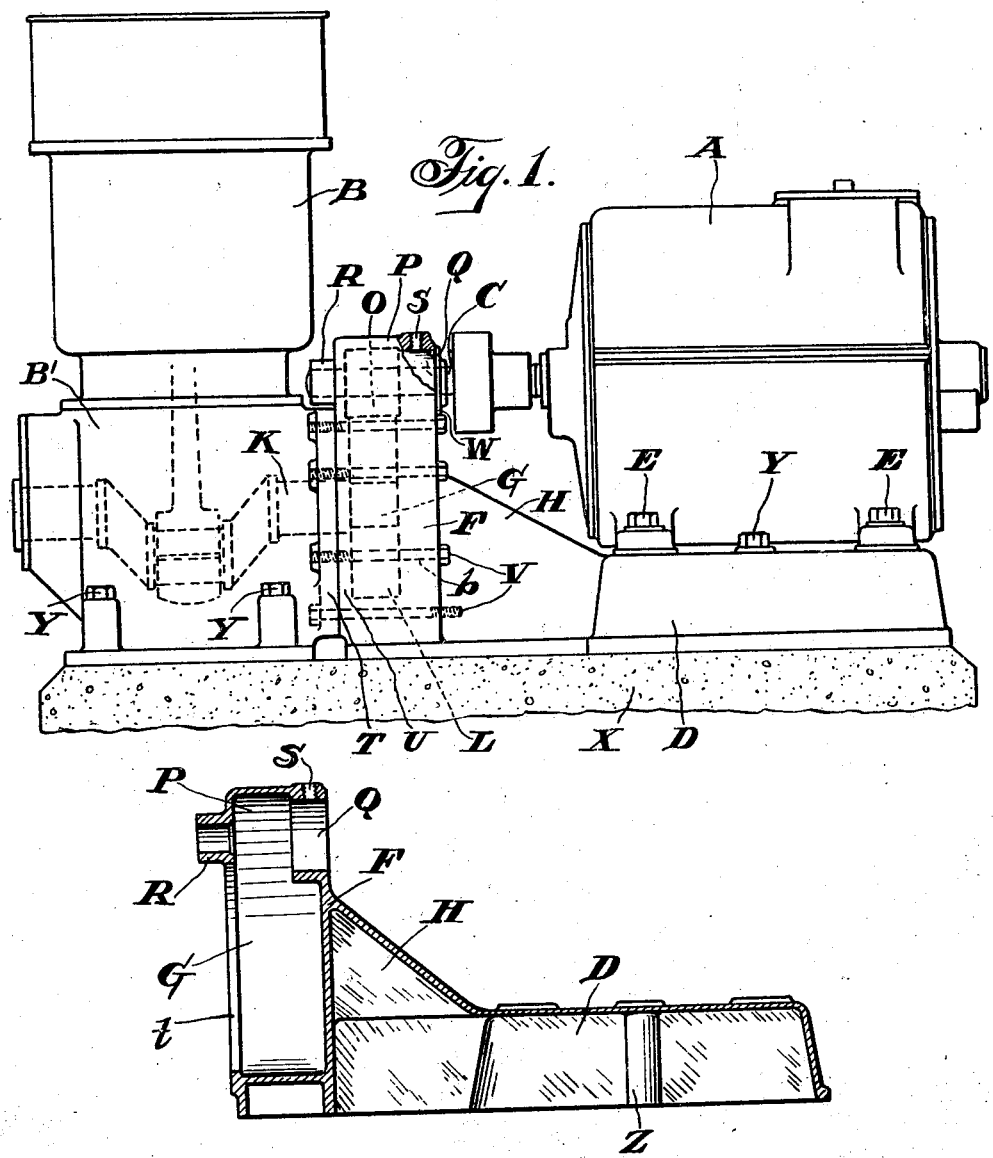

1,488,529

UNITED STATES PATENT OFFICE.

ALLAN O. CARPENTER, OF CORNING, NEW YORK, ASSIGNOR TO INGERSOLL-RAND COMPANY, OF JERSEY CITY, NEW JERSEY, A CORPORATION OF NEW JERSEY.

POWER UNIT.

Application filed September 30, 1922. Serial No. 591,450.

*To all whom it may concern:*

Be it known that I, ALLAN O. CARPENTER, a citizen of the United States, and a resident of Corning, in the county of Steuben and State of New York, have invented a certain Power Unit, of which the following is a specification accompanied by drawings.

This invention relates to power units but more particularly to a combined unitary base and gear case for the motor of a unit of the type in which a driving motor—which may be an electric motor—is adapted to be geared or otherwise directly connected to the power generator, which may be an air compressor or other machine.

The primary object of the present invention is to unify the construction of the driving motor and power generator and to mount the same in fixed operative alignment in proper relation to each other by means of a unitary base and gear case. A further object is to generally simplify and improve the construction of the unit and to permit the base upon which the motor is mounted to be formed integrally with the casing which houses the gears connecting the motor and power generator. A still further object is to enable the integral base and gear casing to be secured directly to the casing of the power generator so that the height of the installation is reduced, and the motor and power generator will form a complete power unit which may be readily aligned, easily transported, and relocated without possibility of disarrangement of the parts.

With the above and other objects in view my invention consists in the features of construction and operation described in the following specification and illustrated in the accompanying drawings, in which—

Figure 1 is a side elevation of the complete power unit;

Figure 2 is a detached longitudinal sectional view of the integral motor base and gear casing;

Figure 3 is an end view of the integral motor base and gear casing shown in Figure 2; and Figure 4 is a top plan view of the same.

In the drawings I have illustrated a power unit consisting of an electric driving motor A and a power generator which may be an air compressor B having a crank case B' and adapted to be geared directly to and driven by the electric motor A having the drive shaft C and adapted to be secured to a base D by bolts E. The base D is relatively flat and is substantially rectangular in form and at the end adjacent to the compressor B is formed with a vertical substantially circular gear case F including a housing G, an inclined reinforcing portion or web H and inclined sides J. The gear case F is adapted to enclose the operative connections between the air compressor and motor.

The crank shaft K of the air compressor extends beyond the outer end of the compressor and carries a toothed gear L which is adapted to be engaged and operated by the driving pinion O carried by the motor drive shaft C and adapted to be enclosed within the supplementary housing P which also forms part of the gear case F. The gear L is enclosed within the housing G and the supplementary housing P is formed with an outwardly directed opening Q adapted to permit insertion of the shaft C and pinion O, and is also formed with an oppositely extending bearing portion R for supporting the drive shaft C. A set screw S retains the bearing shell W which supports drive shaft C at its outer end. Bearing shell W is of sufficient diameter to permit the insertion of pinion O through the opening Q provided for shell W. The end of the compressor contiguous to the housing G is provided with an annular flange T preferably formed with an extension accurately machined to fit the bored opening *t* of the housing G, thus insuring perfect alignment between the main frame of the power generator and the unitary base and gear case of the driving motor. Bolts V are adapted to pass through the aligned holes *b* in the housing G and flanges U and T to rigidly secure the compressor directly against the integral gear case F and base D, and thereby close one end of the compressor crank case. The electric motor is then positioned in proper operative alignment on the base D, the motor drive shaft C being supported in the bearing portion R and the inner annular bearing W seated in the opening Q.

The electric motor is then secured to the base D by the bolts E which are passed through the holes *a* thus rigidly securing the motor A, base D and air compressor B together. The proper operative alignment of the several parts of the unit which is thus obtained is not subject to disturbance, and the entire unit may be easily transported without separation of the parts. When located in position for use the unit may be secured to any desired surface, such as a foundation or floor indicated at X by bolts Y adapted to be passed through holes Z in the base of the compressor A and base D.

I claim:

1. A power unit comprising a driving motor, a power generator having a crank case and adapted to be driven by said motor and directly geared thereto, a base for said motor only and a gear case integral with said base, said gear case including a housing for the operative connection between the motor and power generator and a bearing for the driving element of the motor, said housing forming a closure for one end of the crank case.

2. A power unit comprising a driving motor, a power generator adapted to be driven by said motor and directly geared thereto, a base for said motor and a gear case integral with said base, said gear case including a housing for the operative connection between the motor and power generator and a bearing for the drive shaft of the motor, said gear case being adapted to be bolted directly to said power generator.

3. A power unit comprising in combination an electric motor, an air compressor driven by said motor and directly geared thereto a base for said electric motor and a gear case at one end of and integral with said base, said gear case including a housing for the operative connection between the motor and air compressor and a bearing for the drive shaft of the electric motor, said gear case being adapted to be bolted directly to the end of said air compressor and said motor being adapted to be secured to said base, whereby said motor and air compressor may be assembled as a unit in fixed operative alignment.

In testimony whereof I have signed this specification.

ALLAN O. CARPENTER.